US005404641A

United States Patent [19]
Bratten et al.

[11] Patent Number: 5,404,641
[45] Date of Patent: Apr. 11, 1995

[54] METHOD OF DRILLING THROUGH CONTIGUOUS PLATE MEMBERS USING A ROBOTIC DRILL CLAMP

[75] Inventors: James M. Bratten, Smyrna; Stephen F. Howard, Mt. Juliet, both of Tenn.

[73] Assignee: Avco Corporation, Providence, R.I.

[21] Appl. No.: 107,208

[22] Filed: Aug. 16, 1993

[51] Int. Cl.6 ............................................. B23Q 17/00
[52] U.S. Cl. ..................................... 29/897.2; 29/407; 29/458; 29/464; 29/525.2; 408/1 R; 408/13; 408/87
[58] Field of Search ....................... 29/897.2, 458, 464, 29/468, 525.1, 525.2, 34 B, 407; 408/1 R, 13, 8, 75, 81, 87, 88, 97, 108

[56] References Cited

U.S. PATENT DOCUMENTS

| | | |
|---|---|---|
| 754,321 | 3/1904 | Koeppen . |
| 1,556,855 | 10/1925 | Lewis . |
| 2,467,516 | 4/1949 | Almdale . |
| 2,844,977 | 7/1958 | Morse ................................. 408/75 |
| 3,447,528 | 6/1969 | Annen . |
| 3,575,519 | 4/1971 | Bruner et al. . |
| 3,646,660 | 3/1972 | Sheffer, Jr. . |
| 3,674,375 | 7/1972 | Reed et al. ............................. 408/75 |
| 3,712,750 | 1/1973 | Healy . |
| 3,746,459 | 7/1973 | Kindelan . |
| 3,802,060 | 4/1974 | Gross . |
| 3,813,820 | 6/1974 | Highberg et al. . |
| 4,108,566 | 8/1978 | Jones ................................. 408/88 |
| 4,180,945 | 1/1980 | Zimmerman . |
| 4,269,549 | 5/1981 | Block . |
| 4,310,964 | 1/1982 | Murphy ............................ 29/897.2 |
| 4,485,453 | 11/1984 | Taylor . |
| 4,486,128 | 12/1984 | Baker et al. . |
| 4,601,618 | 7/1986 | McEldowney . |
| 4,649,733 | 3/1987 | Gilmore . |
| 4,679,969 | 7/1987 | Riley ................................. 408/87 |
| 4,864,945 | 9/1989 | Speller, Sr. et al. . |
| 4,885,836 | 12/1989 | Bonomi et al. ...................... 29/34 B |
| 4,897,000 | 1/1990 | Suzuki . |
| 4,949,446 | 8/1990 | Kuwica . |
| 4,955,119 | 9/1990 | Bonomi et al. ...................... 29/34 B |
| 5,040,278 | 8/1991 | Eckold et al. . |
| 5,142,764 | 9/1992 | Whiteside . |
| 5,154,643 | 10/1992 | Catania et al. ...................... 29/34 B |
| 5,161,923 | 11/1992 | Reccius . |

FOREIGN PATENT DOCUMENTS 402222 12/1990 European Pat. Off. ............ 29/34 B

Primary Examiner—Mark Rosenbaum
Assistant Examiner—David P. Bryant
Attorney, Agent, or Firm—Perman & Green

[57] ABSTRACT

A system is provided for drilling through contiguous first and second plate members so as to avoid the formation of burrs at their interface. Using a jig, the plate members are held together at distant locations while assuming a desired mutual orientation in a longitudinally extending upright plane. Loosely suspended from a frame manually movable along the length of the jig, a horseshoe shaped yoke is positioned in a laterally extending upright plane and has a pair of depending legs straddling and adjacent to their associated plate members to be drilled. A hole finding pin on a first leg is manually inserted into a pilot bore provided in the first plate member. Thereupon, opposed clamps on the depending legs firmly engage the plate members in the region of the pilot bore. From the side of the second plate member, enlarged sized bores are drilled through the plate members axially aligned with the pilot bore. The drill is mounted on a second leg of the yoke with an operating axis aligned with the hole finding pin. Sensors on the second leg are engageable with the second plate member for determining the orientation of the drill's operating axis. An attitude drive mechanism on the frame is responsive to the sensors for adjusting the position of the yoke relative to the plate members and permits drilling to occur only when the operating axis of the drill is substantially perpendicular to the second plate member at the location of intended engagement therewith.

3 Claims, 9 Drawing Sheets

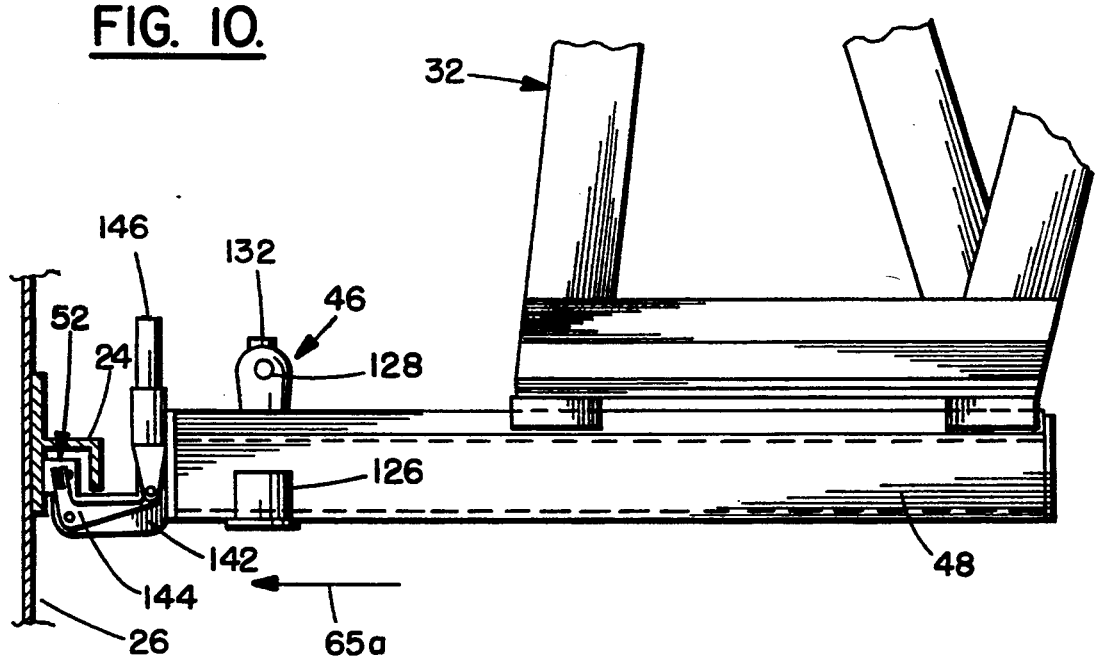
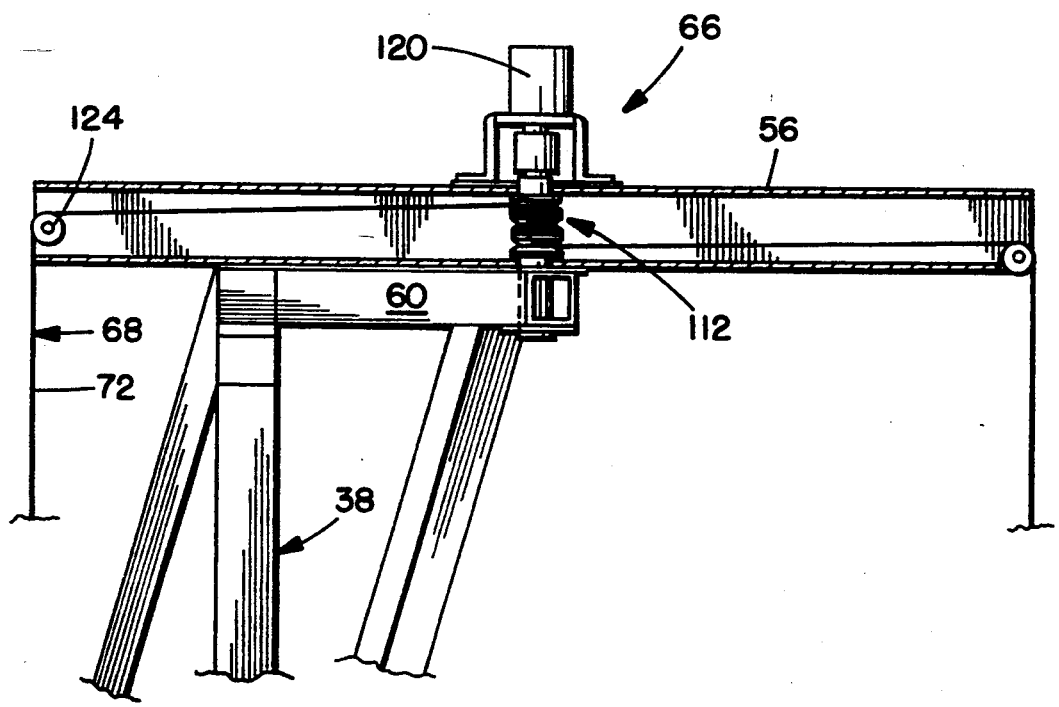

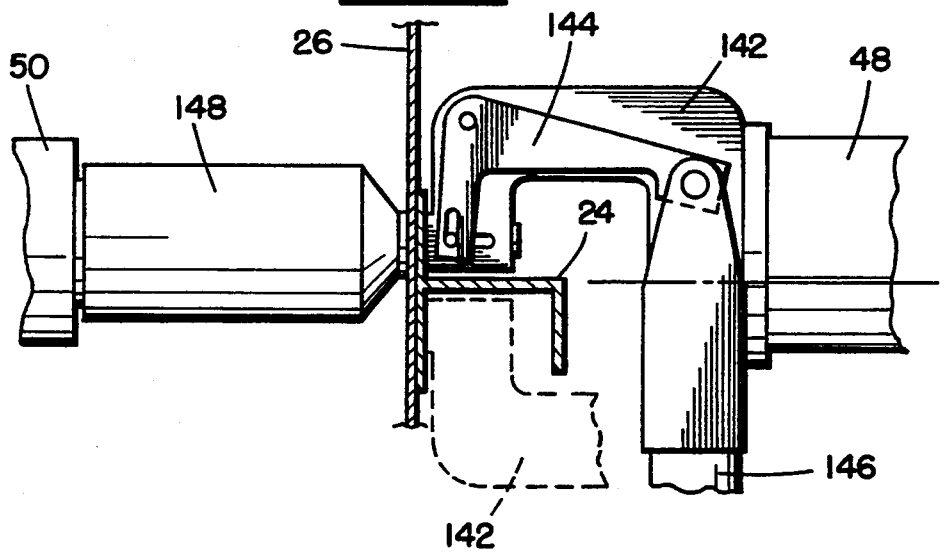
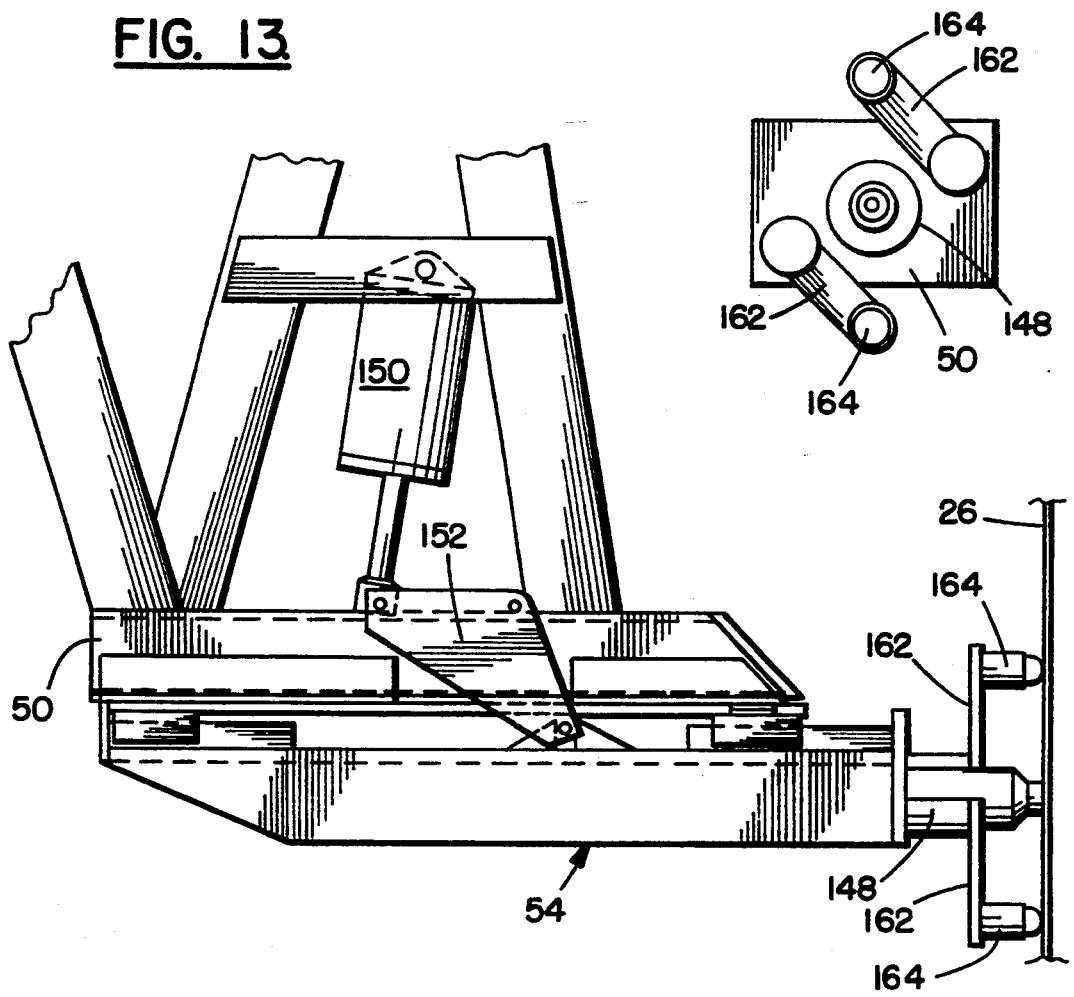

METHOD OF DRILLING THROUGH CONTIGUOUS PLATE MEMBERS USING A ROBOTIC DRILL CLAMP

BACKGROUND OF THE INVENTION

1. Field of the Invention

The present invention relates to a system for clamping and drilling matching bolt holes in the skin and stringers of a wing structure to prevent the formation of interlaminate burrs from forming between the skin and stringers thereby significantly reducing processing time and effort.

2. Description of the Prior Art

The wing structures of certain types of relatively large commercial and military aircraft have a number of components that are joined together to form the finished wing. Such components include the two opposite skins, longitudinally extending stringers, and transversely extending ribs which are primary as well as numerous other components which are secondary in nature. It is common practice for the interior of the wing to serve as a fuel tank. As a result, it is imperative that the completed wing structure be fluid tight. Thus, it is impermissible for there to be a gap, for example, between a stringer and the skin of the wing such that leaks could occur through fastener holes. Efforts to prevent the formation of such gaps are continuous in the course of the assembly process and cause the construction of modern aircraft wings, especially for large commercial and military aircraft, to be a highly labor intensive activity.

In a typical procedure, the stringers for a panel of a wing or other airfoil structure are initially drilled with pilot holes, then mounted in a fixture or jig so as to assume precise relative positions. The jig includes a large number of contour boards which define the contour of the wing panel and also identify the location of each stringer. The stringers are then clamped to the contour boards at spaced locations along their length.

When the stringers have been properly located in the jig, the outer skin is moved into position against the stringers and properly located, again with aid of the contour boards. The skin, in turn, is clamped to the contour boards of the jig. An operator then drills through the pilot holes into the adjacent skin and attaches temporary fasteners in each location at which a pilot hole has been drilled through both the stringer and the skin. This same procedure is performed at all appropriate locations along the length of each stringer. Then, from the skin side, an operator first drills an undersize hole completely through both the skin and the stringer, then reams up to full size, then counter sinks the skin side for subsequent reception of a bolt which will be flush with the outer surface of the skin. Unfortunately, during this procedure, because the temporary jig clamps are placed at spaced locations along the length of each stringer, and not at the immediate location at which the drilling operation occurs, interlaminate burrs undesirably but consistently occur at the interface between the skin and the stringer creating a gap between the skin and the stringer. This gap is undesirable for the reasons stated above. Furthermore, if the resulting gap is not alleviated and a finished fastener is inserted through the drilled holes, it is common for the outer surface of the shank of the fastener to further extrude into the gap. This condition, if permitted to continue, also serves to substantially reduce the fatigue life of both the fastener and of the wing structure at that location. When it is considered that just one wing panel may require several hundred of these fasteners, the problem described becomes one of a first order of magnitude of concern.

While it is presently common for such interlaminate burrs to occur during the initial drilling operation, it is also common practice to require their elimination. In order to do this, it is, necessary to remove both the skin and the stringers from the jig and to deburr them at another location. When the deburring operation on both the skin and the stringers is completed, those components are again placed in the jig and suitably clamped. In customary fashion, a suitable sealant is applied to the mating surfaces to further assure a leak-proof assembly. After the stringers have been properly fastened to the skin, typically at each rib location, an automatic riveting machine is then operated to drill a large number of holes through the skin and stringer at closely spaced longitudinal locations and inserted and apply rivets at each of these locations.

The inventors are aware of a large number of machines and processes which are of value for the manufacturing efforts with which they are engaged. However, none of these known devices or methods have the ability to correct this interlaminate burr problem which has been described and which requires such labor intensive effort to correct.

Typical of the prior art known to the inventors is U.S. Pat. No. 4,601,618 to McEldowney which discloses a device utilized in the manufacture of aircraft structures which serves to locate a pilot hole that extends only part of the way through a workpiece. The device comprises a clamp which includes opposing jaws movable toward and away from each other along a movable axis. The jaws have aligned openings extending therethrough generally parallel to the operating axis. A pilot is provided which can project from one of the openings toward the opposing jaw and the jaws are biased together for clamping a workpiece between them. A drill bushing is provided in the other of the openings for guiding a drill bit for drilling the workpiece. The pilot can be subsequently removed from its associated opening to enable the pilot hole to be drilled all the way through the workpiece.

Another pertinent disclosure is provided in Patent No. 4,108,566 to Jones which discloses a mechanized contour-following drill machine for drilling and reaming holes in a contoured surface. The machine operates to orient a drill spindle of a drill assembly to a position perpendicular to a plane tangent to the contoured surface of a workpiece so that the centerline of the holes to be drilled are perpendicular to the contoured surface.

In Pat. No. 4,897,000 to Suzuki, apparatus is provided for counter sinking rivet holes preformed at circumferential spacings in the fuselage of an aircraft and in annular reinforcing ribs of H-shaped cross section in the fuselage at axial spacings. An operating cylinder has a piston rod to which is coupled an offset anvil for pressing the fuselage and a rib against a toolhead. An aligning pin is associated with the anvil for locating and engaging the preformed rivet holes. The countersink tool is operable when the fuselage and rib are firmly clamped. The piston rod and associated anvil are not only linearly displaceable but are also rotatable about their own axes by a fluid motor through an angle of at least 180°.

In Pat. No. 5,161,923 to Reccius, a drill machine is operated in combination with a clamping sleeve which is coaxial with the drill bit. The clamping sleeve coacts with a template to hold a pair of sheet workpieces together for the drilling operation.

While the prior art as exemplified by these patents relates to machines and processes which were significant when they were first developed and, indeed, still represent significant technology, none of them or any others known to the inventors possess the ability to correct the problem here addressed by the inventors.

It was in light, then, of the prior art as represented above, that the present invention has been conceived and is now reduced to practice.

SUMMARY OF THE INVENTION

According to the present invention, a system is provided for drilling through contiguous first and second plate members such that the formation of burrs at the interface between them is avoided. A pilot bore is drilled through the first plate member. Using a jig, the plate members are held together at distant locations while assuming a desired mutual orientation in a longitudinally extending upright plane. A frame is manually movable along the length of the jig. A horseshoe shaped yoke is loosely suspended from the frame and is positioned in a laterally extending upright plane straddling the plate members to be drilled. The yoke has depending legs which extend adjacent their respective plate members. A hole finding pin on a first leg of the yoke is manually inserted into the pilot bore. Thereupon, opposed clamps on the depending legs firmly engage the plate members in the region of the pilot bore. From the side of the second plate member, fastener receiving bores are drilled through the plate members axially aligned with the pilot bore. The drill is mounted on a second leg of the yoke with an operating axis aligned with the hole finding pin. Sensors on the second leg are engageable with the second plate member for determining the orientation of the drill's operating axis. An attitude drive mechanism on the frame is responsive to the sensor means for adjusting the position of the yoke relative to the first and second plate members and permits drilling to occur when the operating axis of the drill is substantially perpendicular to the second plate member at the location of intended engagement therewith.

A primary object of the invention, therefore, is to provide a simplified system for drilling axially aligned through bores in contiguous plate members while preventing the occurrence of interlaminate burrs.

Another object of the invention is to provide such a system in which the plate members comprise a wing skin and the flange of an associated stringer.

A further object of the invention is to provide such a system which enables an operator to rapidly locate pre-drilled pilot bores in a stringer, then, while in a supporting jig, to accurately and rapidly drill the through bores in a condition to receive permanent fasteners without requiring a deburring operation or removal from the jig before the permanent fasteners are installed.

Still another object of the invention is to provide a method of drilling through contiguous plate members which comprises the steps of drilling a pilot bore through a first plate member, holding the first plate member against a second plate member in a desired mutual orientation, inserting a hole finder into the pilot bore, releasably clamping the first plate member to the second plate member from opposite sides thereof proximate to the pilot bore, and from the side of the second plate member, drilling fastener receiving bores through the first and second plate members axially aligned with the pilot bore such that the formation of burrs at the interface between the first and second plate members is avoided.

Yet a further object of the invention is to provide apparatus for drilling transversely through contiguous plate members which comprises jig members for holding first and second plate members against one another in a desired mutual orientation and positioned in a longitudinally extending substantially upright plane, a horseshoe shaped yoke positioned in a laterally extending upright plane straddling the first and second plate members to be drilled, the yoke having first and second depending legs and a transverse bight integral with the legs, the first leg being adjacent the first plate member and the second leg being adjacent the second plate member, a frame for supporting the yoke, the frame being selectively movable along the length of said jig means, an aligning pin on the first terminal end selectively engageable with a pilot hole provided in the first plate member, a first clamp on the first leg selectively engageable with the first plate member, a second clamp on the second leg selectively engageable with the second plate member, the first and second clamps operable to simultaneously press the first and second plate members together upon engagement of the pilot hole by the aligning pin, and drilling apparatus on the second leg axially aligned with the aligning pin and operable upon engagement of the first clamp with the first plate member and of the second clamp with the second plate member for drilling through the first and second plate members fastener receiving bores which are axially aligned with the pilot bore such that the formation of burrs at the interface between the first and second plate members is avoided.

Still another object of the invention is to provide such an apparatus which includes sensor apparatus on the second leg engageable with the second plate member for determining the orientation of the drill apparatus relative to the second plate member, attitude drive apparatus on the frame being responsive to the sensor apparatus for adjusting the position of the yoke relative to the first and second plate members, the drill apparatus including a motor for rotating a drill bit, the motor being operable when the operating axis of the drill bit is substantially perpendicular to the second plate member at the location of intended engagement therewith.

Yet another object of the invention is to provide such an apparatus which includes a flexible support for the yoke providing substantially universal movement of the yoke on the frame.

Still a further object of the invention is to provide motorized windlass apparatus for selectively raising and lowering the yoke and for rotating the yoke about a longitudinally extending axis.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 7 is a detail front elevation view of certain components illustrated in FIGS. 1-3 and 5, certain parts being cut away and shown in section;

FIG. 10 is a detail front elevation view of certain parts illustrated in FIGS. 1-3 and 5;

FIG. 13 is a detail front elevational view of certain components illustrated in FIGS. 1-3 and 5;

FIG. 14 is a detail side elevation view of certain components illustrated in FIG. 13; and FIG. 15 is a detail front elevational view, similar to FIG. 12, illustrating another operating position of the hole finding mechanism.

DETAILED DESCRIPTION OF PREFERRED EMBODIMENT

Figure 1:
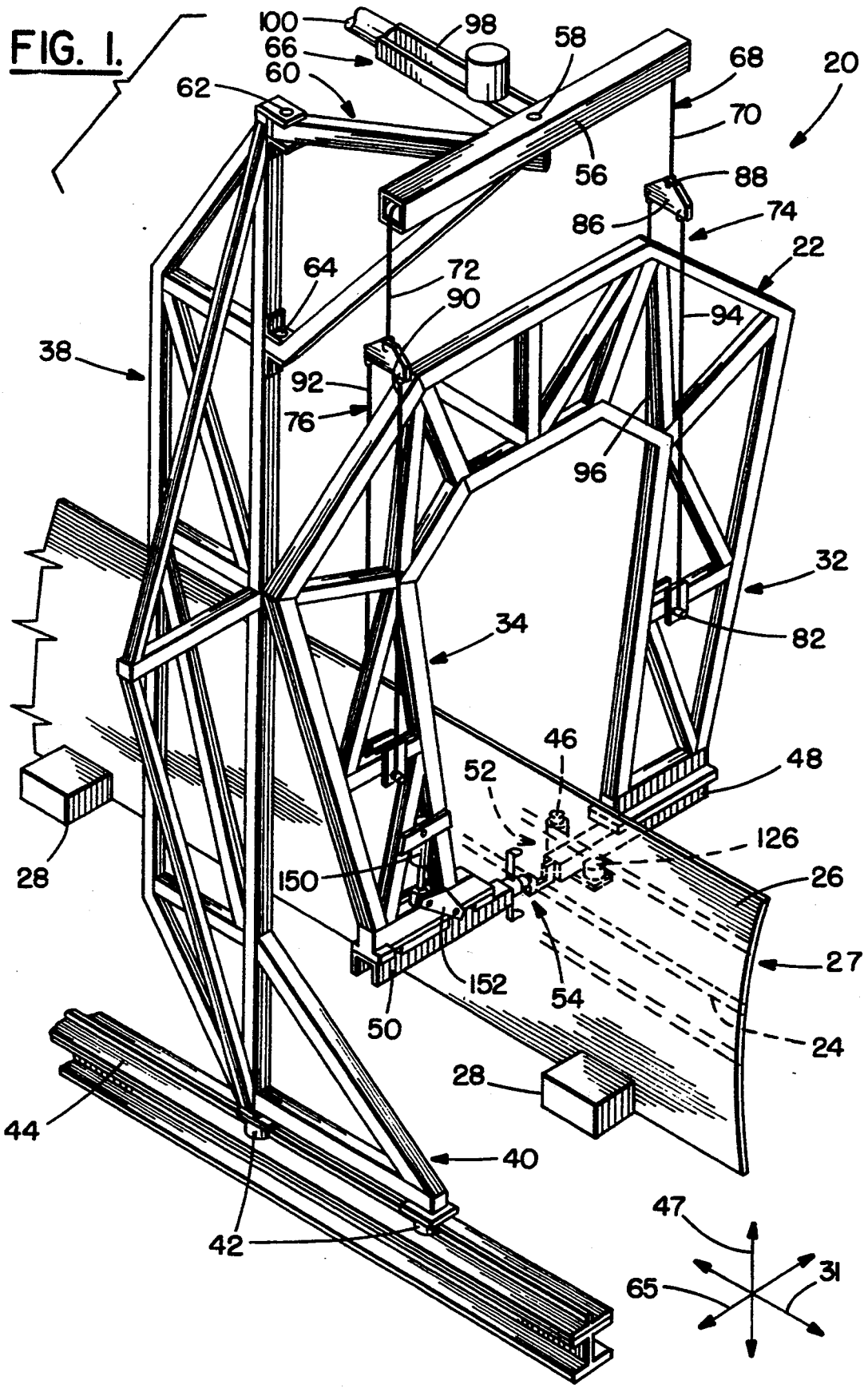
FIG. 1 is a perspective view of clamping and drilling apparatus embodying the present invention.
Figure 2:
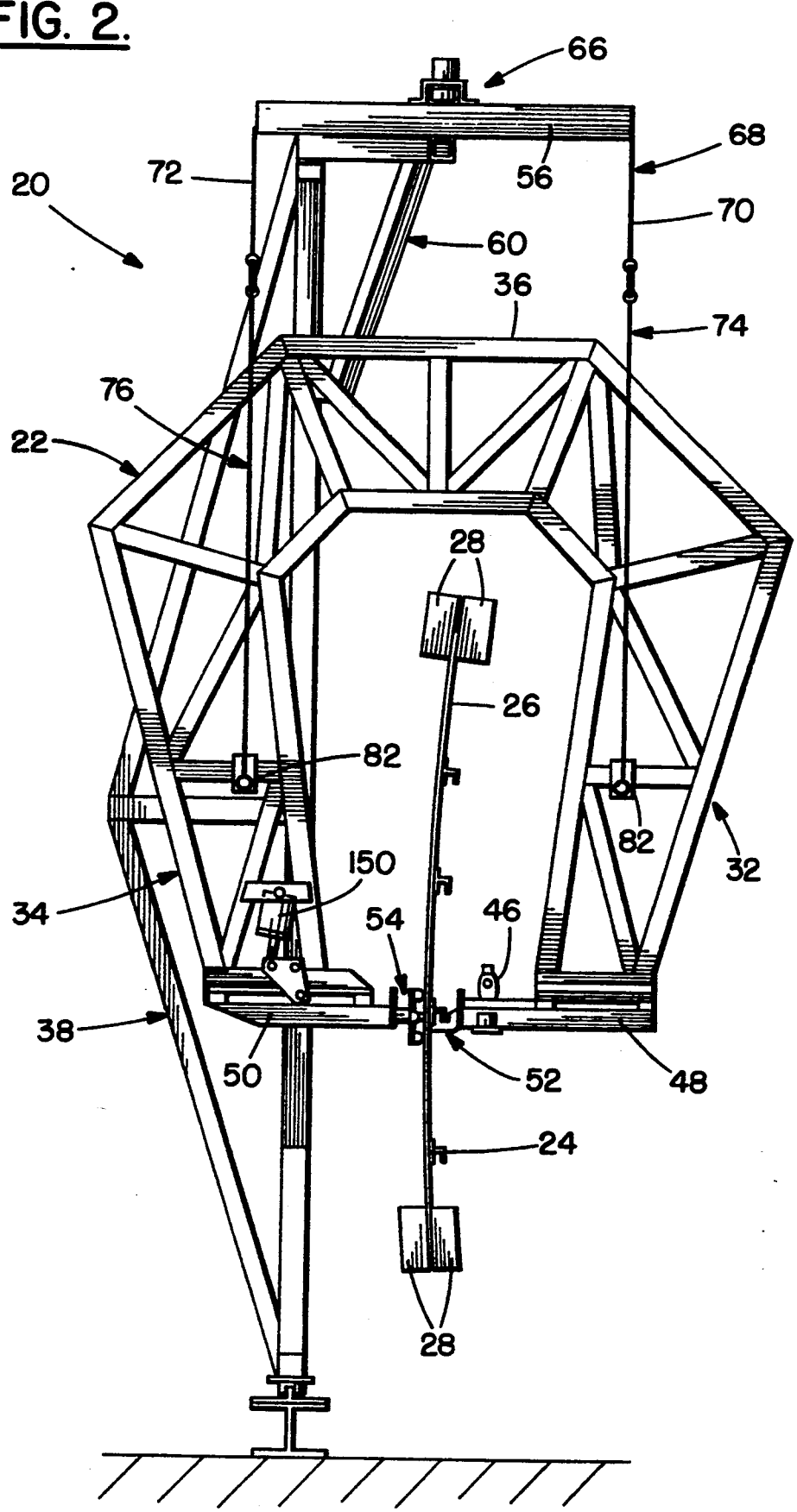
FIG. 2 is a front elevation view of the clamping and drilling apparatus illustrated in FIG. 1.
Figure 3:
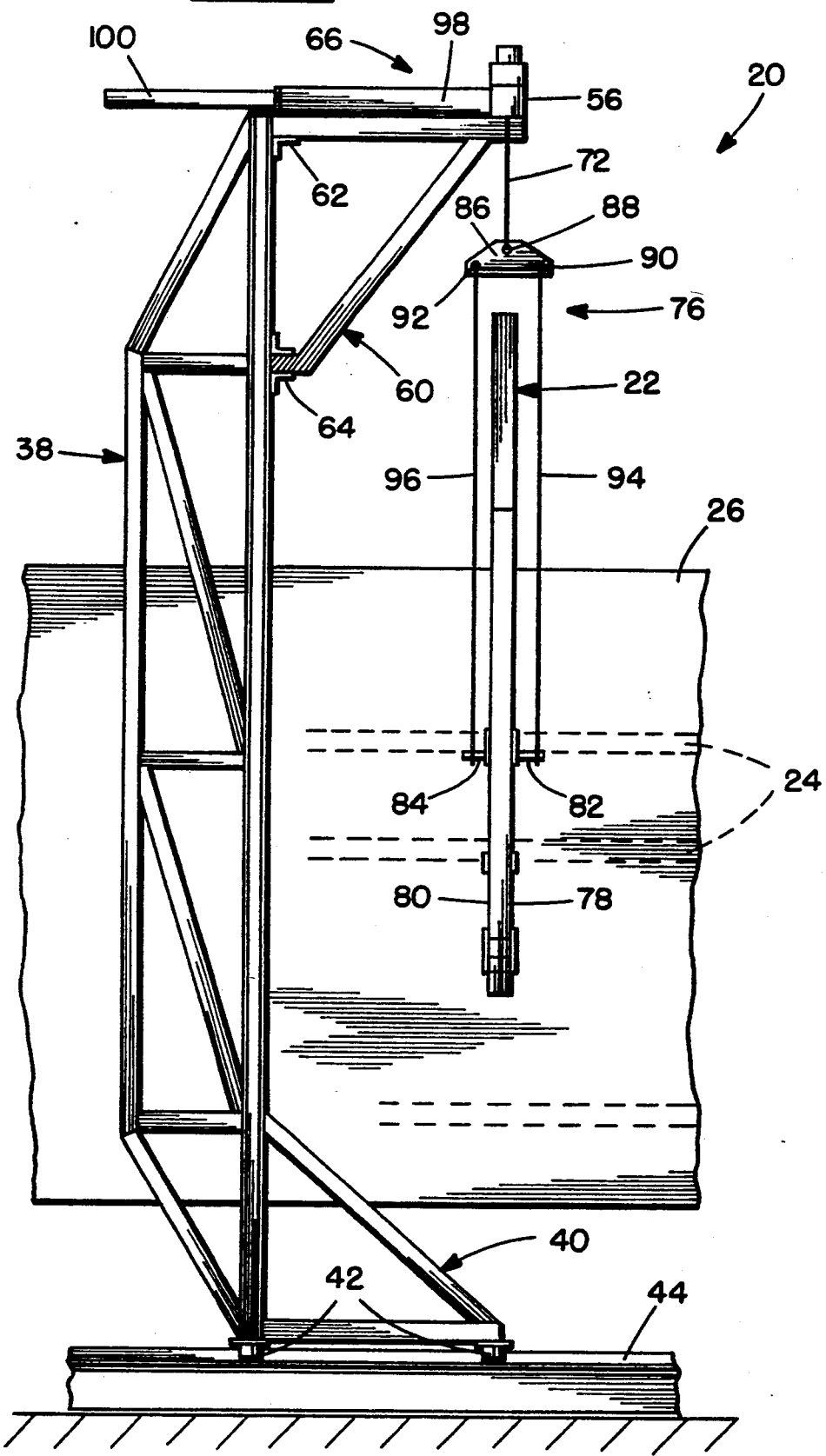
FIG. 3 is a side elevation view of the clamping and drilling apparatus illustrated in FIGS. 1 and 2.
Figure 4:
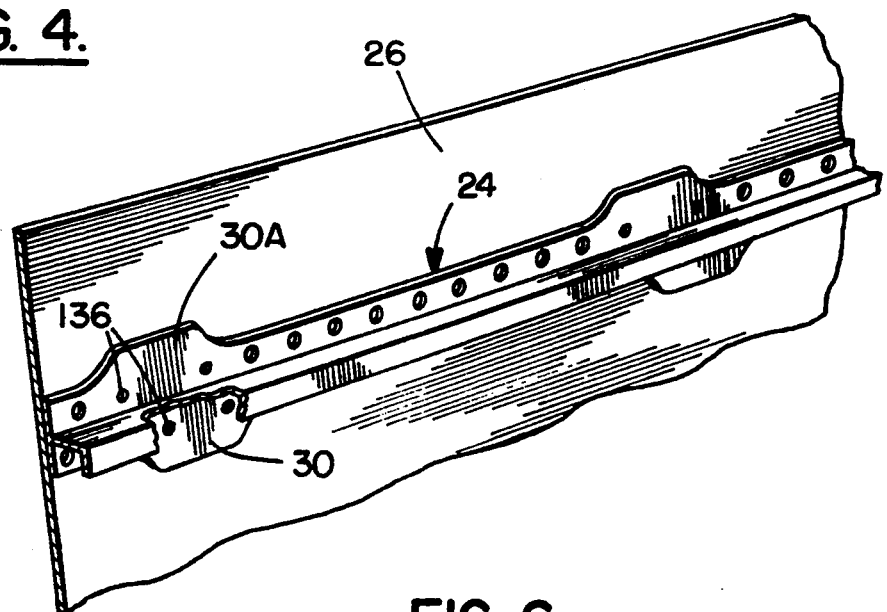
FIG. 4 is a detail perspective view of a workpiece assembly to be operated upon by the apparatus of the present invention.
Figure 6:
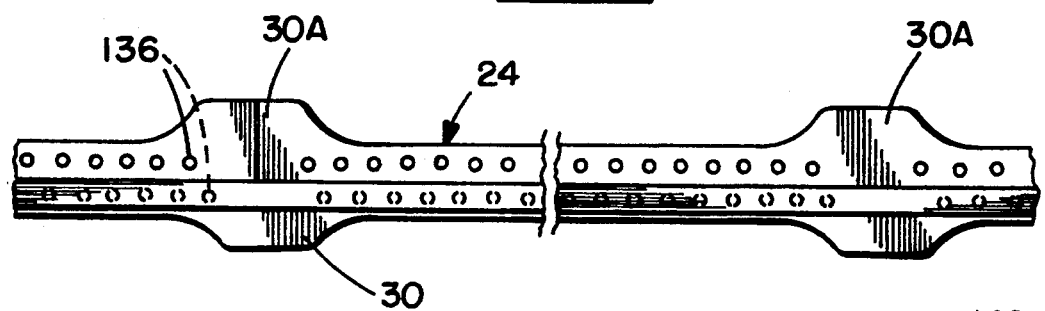
FIG. 6 is a detail side elevation view of a component of the workpiece assembly illustrated in FIG. 4.

Turn now to the drawings and, initially, to FIGS. 1, 2, and 3 which illustrate clamping and drilling apparatus 20 embodying the present invention. The apparatus 20 includes a horseshoe shaped yoke 22 positioned in a laterally extending upright plane straddling first and second plate members 24, 26 (also see FIG. 4) of a workpiece assembly 27 to be drilled. As depicted, the second plate member 26 may be, for example, the skin of an aircraft wing and the first plate member 24 may be a stringer intended to be attached to the skin. Of course, it will be appreciated that the invention need not be limited to those exclusive end use items, although, for ease of explanation, the ensuing disclosure will use that terminology.

As illustrated in FIGS. 1 and 2, a fixture or jig comprised of a plurality of contour boards 28 spaced longitudinally and in elevation serve in a known manner, but outside of the range of the illustrations in FIGS. 1 and 2, to hold the stringers 24 and sections of skin 26 against one another in a desired mutual orientation as they await further processing and an eventual fastening operation. For this purpose, the skin 26 and a mounting flange 30 (FIG. 4) of the stringer 24 are positioned in a longitudinally extending (that is, in directions generally indicated by a double arrowhead 31, see FIG. 1) substantially upright plane. The yoke 22 has first and second depending legs 32, 34 which extend from a transverse bight 36 integral with the legs. The first leg 32 is adjacent, that is, on the side of, the stringers 24, and the second leg 34 is adjacent, that is, on the side of, the skin 26.

A frame 38 for supporting the yoke 22 is illustrated as being a three dimensional truss assembly. The lowermost part of the frame 38 comprises a trolley 40 which utilizes spaced apart rollers 42 rollingly engaged with a track 44 which extends in a longitudinal direction spaced away from but parallel with the assembly comprised of the stringers 24 and the skin 26. By reason of this construction, the frame 38 is capable without a movement which enables the yoke 22 to translate lengthwise of the workpiece assembly 27 comprised of the stringers 24 and the skin 26. The trolley 40 can be motorized or with the use of high quality bearings for the rollers 42, it can be manually movable even though it is of a substantial size and bulk.

By means of a suitable controller 46 which may be hand held, and in a manner which will be more clearly described below, the apparatus 20 is powered to enable the operator to raise and lower the yoke 22 (that is, in directions generally indicated by a double arrowhead 47, see FIG. 1) and also to rotate the yoke about a longitudinal axis (that is, about an axis generally parallel to the double arrowhead 31 of FIG. 1). Vertical movement indicated by double arrowhead 47 may also be achieved manually as by using a counter balance cylinder (not shown). All other movements of the yoke 22 are achieved manually.

Figure 5:
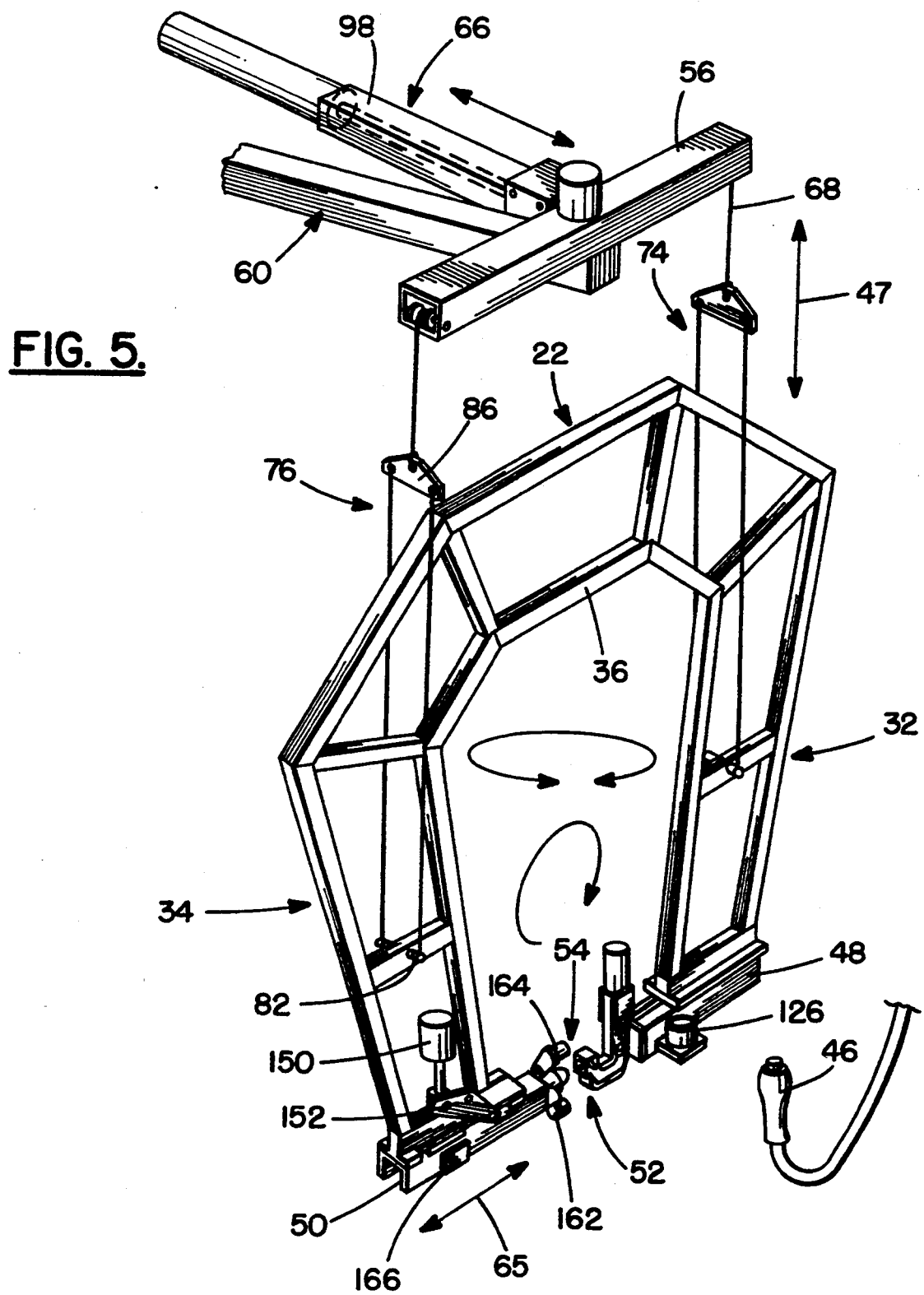
FIG. 5 is a detail perspective view illustrating more clearly certain components illustrated in FIG. 1.

As especially well seen in FIGS. 1, 2, and 5, a first transverse arm 48 is fixed to a lowermost end of the first leg 32 and a second transverse arm 50 is fixed to a lowermost end of the second leg 34. A first clamping member 52 and a second clamping member 54, mutually aligned and opposed to one another, are moved into engagement with the workpiece assembly 27 defined by the stringers 24 and by the skin 26 until they are clampingly engaged as seen in FIG. 2. The first clamping member 52 is mounted on the transverse arm 48 and fixed against movement relative to the arm 48 in all directions including laterally, that is, in directions generally indicated by a double arrowhead 65 (FIG. 1). The second clamping member 54 is mounted on the transverse arm 50 and is movable, selectively, relative to the transverse arm 48 in the lateral directions generally indicated by the double arrowhead 65.

Before proceeding with a detailed explanation of the operations which take place in the region of the clamping members 52, 54, it is considered desirable to first describe the support arrangement for the yoke 22 and the manner in which the yoke can be raised or lowered as well as rotated about a longitudinal axis transverse of the plane in which it resides.

A cross beam 56 from which the yoke 22 is suspended is pivotally mounted for limited rotation about a vertical axis (that is, about an axis generally parallel to the double arrowhead 47) on a pin 58 at an extreme end of a triangular shaped gate member 60. The gate member 60 is hinged as at 62, 64 to the frame 38, also for pivotal movement about a vertical axis. Pivotal movement of the gate member 60 on the hinges 62, 64 serves to allow movement of the yoke 22 in a lateral direction. However, it will be appreciated that it might be desirable in practice to immobilize the hinges 62, 64 once the work assembly 27 defined by the stringers 24 and skin 26 has been established and suitably located in a transverse or lateral direction (that is, in directions generally indicated by double arrowhead 65, see FIG. 1) by means of the contour boards 28.

Figure 8:
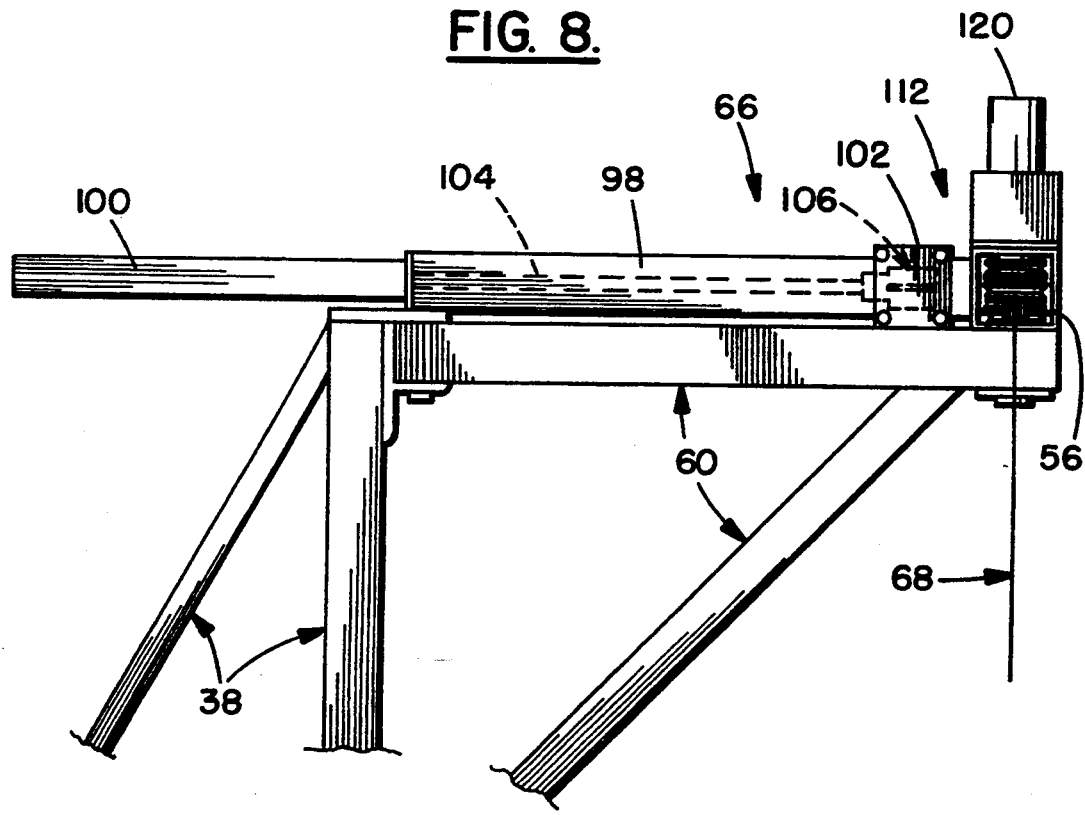
FIG. 8 is a side elevation view of the components illustrated in FIG. 7.

With continued reference to FIGS. 1, 2, 3, and 5, already considered, and with further reference now to FIGS. 7, 8, and 9, a windlass mechanism 66 will now be described for selectively raising and lowering the yoke 22 and for rotating the yoke 22 about a longitudinally extending axis. The windlass mechanism 66 includes the laterally extending cross beam 56 previously mentioned as well as a control cable 68 having first and second opposed ends 70, 72, respectively. The first opposed end 70 is suitably connected to a first lower cable assembly 74 and the second opposed end 72 is suitably connected to a second lower cable assembly 76.

The yoke has front and rear longitudinally spaced sides 78, 80 (see FIG. 3) and includes fore and aft cable mounts 82, 84 on each of the legs 32, 34 for attachment of the lower ends of the lower cable assemblies 74, 76, respectively. All of the cable mounts 82, 84 lie in a substantially horizontal plane and are located substantially at the center of gravity of the yoke 22 when the yoke assumes a neutral orientation. The cable mounts 82, 84 are preferably movably attached to the yoke 22 so as to accommodate possible changes in the center of gravity of the yoke.

The lower cable assemblies 74, 76 are mutually identical and will now be described. Each is comprised of a longitudinally extending triangularly shaped cable spreader 86 having a central mount 88 and fore and aft mounts 90, 92, respectively. The ends 70, 72 of the control cable 68 are connected to the central mounts 88 of their associated cable spreader. A length of cable referred to as a fore lower run 94 extends from the fore mount 90 to the fore cable mount 82. In similar fashion, a length of cable referred to as an aft lower run 96 extends from the aft mount 92 to the aft cable mount 84.

Viewing especially FIGS. 1, 3, 5, and 8, an upper support arm 98 is seen to be fixed, as by welding, to the cross beam 56 intermediate its ends and extends transversely therefrom longitudinally in an aft direction. It serves to support an elevation actuator 100 at its extreme aft end which serves to operate a carriage 102 which is fixed to an extremity of an actuator rod 104. The construction of the carriage 102 is such that it can roll the length of the support arm 98 to the extent permitted by the elevation actuator 100 and its associated rod 104. In practice, the carriage 102 is longitudinally movable between an advanced position adjacent the cross beam 56 at which, as will be described, the yoke 22 is in a lowered position and a retracted position remote from the cross beam at which the yoke is in an elevated position.

Figure 9:
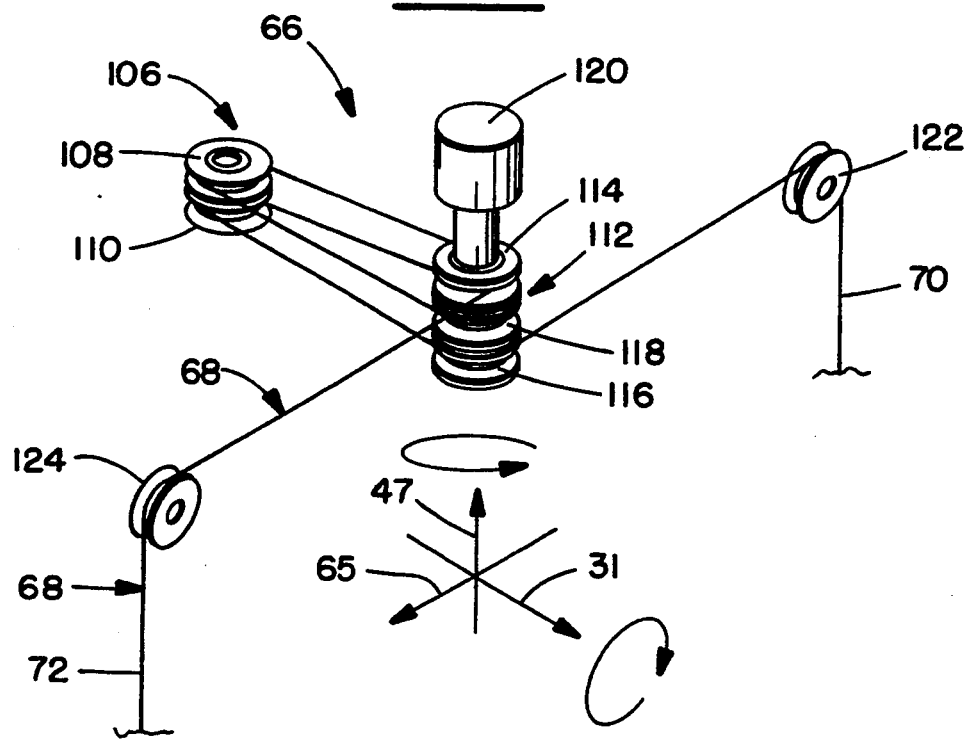
FIG. 9 is a diagrammatic perspective view of certain parts illustrated in FIGS. 7 and 8.

As seen in FIG. 9, cylindrical drum mechanism 106 is suitably mounted on the carriage 102 and comprises upper and lower coaxial idler pulleys 108, 110, respectively, (see especially FIG. 9) rotatably mounted on a substantially vertical axis. With continued reference to FIG. 9, another cylindrical drum mechanism 112 is seen to comprise upper and lower idler pulleys 114, 116, respectively, and an intermediate drive pulley 118 which is operatively coupled to a rotary actuator 120.

As seen particularly well in FIGS. 7 and 9, idler pulleys 122, 124, are rotatably mounted about parallel axes at opposed ends of the cross beam 56. The rotational axes of the pulleys 122, 124 are parallel and substantially perpendicular to a lengthwise axis of the cross beam.

Thus, viewing especially FIG. 9, it is seen that the control cable 68 extends from an opposed end 70, then, in sequence, over pulleys 122, 116, 110, 118, 108, 114, and 124, to its second opposed end 72. In order to effect raising and lowering of the yoke 22, the elevation actuator 100 is operated to move the carriage 102 and, with it, the drum mechanism 106. As the drum mechanism 106 is moved to the left, viewing FIGS. 8 and 9, the vertical portions of the control cable 68 are shortened with the result that the opposed ends 70, 72 are raised and, with them, the lower cable assemblies 74, 76, and the yoke 22. The reverse operation occurs when the carriage 102 is moved from left to right, viewing FIGS. 8 and 9.

Additionally, at any given elevation of the yoke 22, that is, at any given positioning of the carriage 102 along the length of the upper support arm 98, the rotary actuator 120 can be operated to rotate the yoke about a longitudinal axis as defined by the double arrowhead 31, that is, about an axis which is generally perpendicular to a plane containing the yoke 22. Specifically, as the rotary actuator 120 rotates counterclockwise (FIG. 9), opposed end 72 of the control cable 68 is raised, and opposed end 70 is lowered, with the result that the yoke 22 is rotated in a clockwise direction, viewing FIG. 2. It will be appreciated that the load experienced by the rotary actuator 120 is minimized by reason of the preferred locations of the fore and aft cable mounts 82, 84 substantially on the center of gravity of the yoke. In a reverse fashion, operation of the rotary actuator 120 to rotate the drive pulley 118 in a clockwise direction will result in the raising of the opposed end 70, the lowering of the opposed end 72 and rotation of the yoke 22 in a counterclockwise direction, viewing FIG. 2.

It was previously explained that the operator of the clamping and drilling apparatus 20 can perform a number of operations using the hand-held controller 46. It should also be explained that the base of the hand-held controller can be inserted into either one of a pair of sockets 126 provided on either side of the transverse arm 48. The operator determines which particular socket to place the controller into depending upon which side of the leg 32 he or she is located at the time. With the controller 46 so received in an associated socket 126, the operator can readily and simultaneously perform both manual and motorized functions of the apparatus. The motorized operations are performed by pressing buttons 128 and 132 on the controller 46 which are diagrammatically depicted in FIG. 10. The function for each of these buttons will be described below.

Figure 11A:
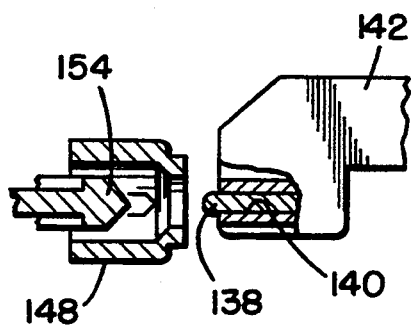
FIGS. 11A-11G are a series of fragmentary, diagrammatic elevations, partly shown broken away and partly sectioned for clarity, showing operational processes for locating a pilot hole in one component of a workpiece assembly, then drilling a fastener receiving hole aligned with the pilot hole through proximately located components.
Figure 11B:
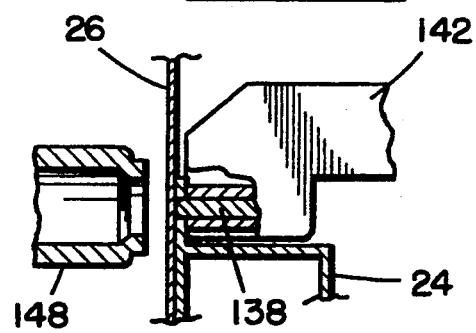

When it comes time to initiate a drilling operation, the operator inserts the controller 46 into an associated socket 126 and manually moves the yoke longitudinally of the workpiece assembly 27. FIG. 11A shows the state of the apparatus 20 when the workpiece assembly 27 is not loaded into the jig. Simultaneously, the operator presses the height adjustment button 128 to align the clamping member 52 on the transverse arm 48 with a pilot hole 136 in the mounting flange 30 of a stringer 24. When a clamping member 52 is substantially aligned with the sought after pilot hole 136, the operator then moves the transverse arm 48 manually in the direction of arrow 65a (FIG. 10) which serves to position a normally advanced aligning pin (see FIGS. 11A, 11B, and 12) for engagement with the pilot hole. The aligning pin 138 is slidable along a bore 140 formed in an L-shaped anvil 142 of the clamping member 52. The aligning pin 138 is moved in the bore 140 by means of a bell crank 144 which, in turn, is operated by an aligning pin actuator 146. When the tip of the aligning pin 138 is received in the pilot hole 136, the operator then presses the clamping button 132. This serves to draw the clamping member 54 into engagement with the opposite surface of the skin 26 from which the stringer 24 is located.

Figure 12:
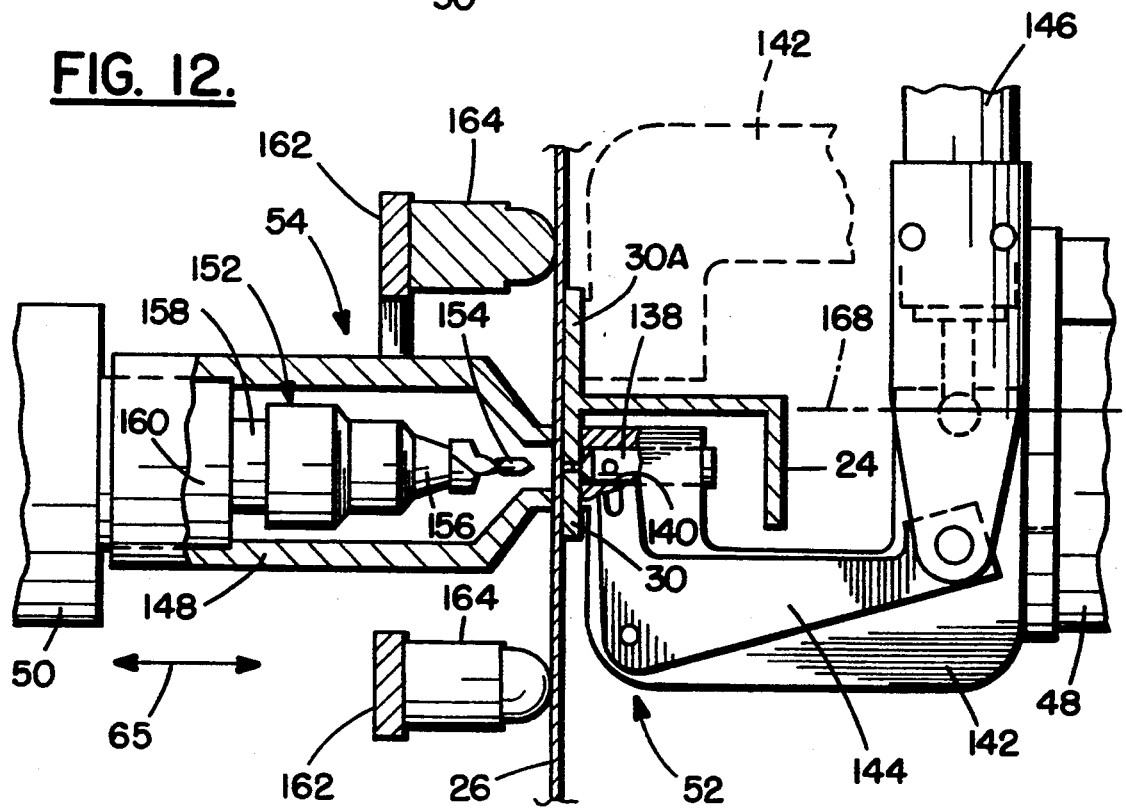
FIG. 12 is a detail front elevation view, partially cut away and shown in section for clarity, of components illustrated in FIGS. 1-3 and 5.
Figure 11C:
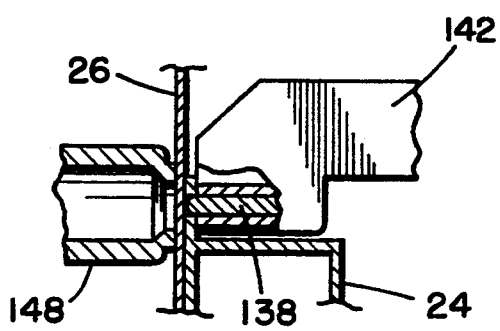

It was earlier mentioned that the transverse arm 50 is positioned at the base of the second leg 34 and is aligned with the transverse arm 48 at the base of the first leg 32. The clamping member 54 is an integral part of the transverse arm 50 except that, as seen in FIG. 13, it is laterally movable (toward and away from the skin 26) relative to the transverse arm. Unlike the clamping member 52 which is manually moved by the operator into engagement with the workpiece assembly 27, the clamping member 54 is motorized for that purpose. Specifically, the clamping member 54 and, more particularly, a cylindrical clamp head 148 is selectively movable on the transverse arm 50 in the transverse directions indicated by the double arrowhead 65 (FIG. 12). Still more specifically, the clamp-head actuator 150 which is suitably mounted on the lower end of the second leg 34 operates a crank 152 which is pivotally attached both to the leg 34 and to structure integral with the clamp head 148. The clamp head 148 is mounted on the transverse arm 50 for reciprocal movement in the directions indicated by the double arrowhead 65. Hence, operation of the clamping button 132 is effective to cause the clamp head 148 to engage the skin 26 (FIG. 11C) or, oppositely, to be disengaged therefrom. When firm engagement of the workpiece assembly has been achieved and the drilling operation, about to be described, commences, the aligning pin 138 is again withdrawn.

A drill mechanism 152 is housed within the clamp head 148 (FIG. 12) and includes a drill bit 154 and a drill chuck 156 enabling removal and replacement of the drill bit. The drill mechanism 152 also includes a linear actuator 158 for advancing and retracting the drill bit along its operating axis as well as a rotary actuator 160 for rotating the drill bit about its operating axis. The operating axis of the drill bit 154 must be substantially aligned with that of the aligning pin 138. Additionally, before the drill mechanism 152 is operated in the manner intended by the invention, the operating axis of the drill bit 154 must be substantially perpendicular to skin 26 and to the mounting flange 30 of the stringer 24 at the location of the pilot hole 136.

To assure such perpendicularity, a sensing mechanism is provided which will now be described. Integral with the clamp head 148 are a pair of sensor arms 162 which radiate from diametrically opposite locations of the clamp head. Each sensor arm 162 terminates at a sensor foot 164 which extends laterally in the direction of the workpiece assembly 27.

Figure 11D:
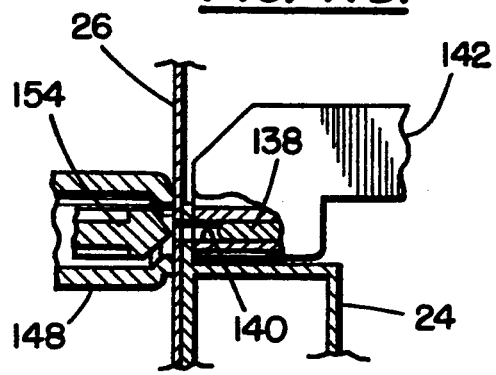
Figure 11E:
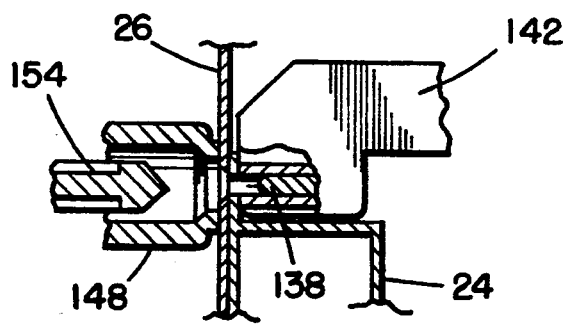
Figure 11F:
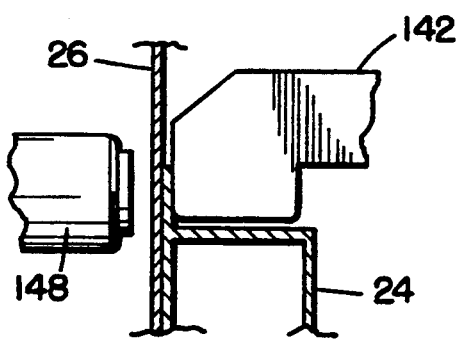

When the operator presses the clamping button 132 to draw the clamp head 148 against the skin 26, the sensor feet 164 similarly move into engagement with the skin 26. At such time that a suitable sensor mechanism 166 (FIG. 5), which may be any suitable linear potentiometer or LVDT device, recognizes that a proper three-point engagement (that is, clamp head 148 and both of the sensor feet 164) has been achieved, continued pressure on the clamping button 132 by the operator will be effective to initiate a sequence of operations. According to this sequence, the aligning pin 138 is withdrawn, the rotary actuator 160 is operated to rotate the drill bit 154, and the linear actuator 158 is operated to advance the drill bit toward, then through, the skin 26 and the flange 30 of the stringer 24 (FIG. 11D). The diameter of the new hole being drilled by the drill bit 154 is desirably larger than that of the original pilot hole and, preferably, is of a diameter sufficient to receive a suitable fastener. When the drilling operation is completed but with continued operation of the linear actuator 158 (FIG. 12), the clamping button 132 is then released by the operator in order to initiate withdrawal of the drill bit 154 (FIG. 11E) and disengagement of the clamp head 148 from the skin 26 (FIG. 11F).

Figure 11G:
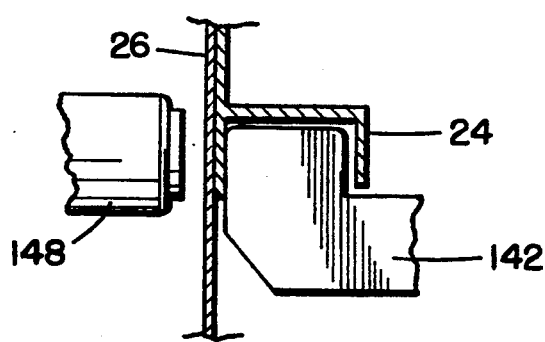

When all of the pilot holes in all of the mounting flanges 30 have been located and re-drilled in the manner just described, then it is possible for the operator to rotate the anvil 142 about a lateral axis 168 (FIG. 12) to the dotted line position for operating on the pilot holes 136 of all of the upper flanges 30A. This is also indicated in FIG. 11G.

While a preferred embodiment of the invention has been disclosed in detail, it should be understood by those skilled in the art that various other modifications may be made to the illustrated embodiments without departing from the scope of the invention as described in the specification and defined in the appended claims.

What is claimed is:

1. A method of drilling through contiguous first and second plate members wherein the first plate member is an airfoil of an aircraft and the second plate member is a flange of a stringer for the airfoil, said method comprising the steps of:

(a) providing a pilot bore in the first plate member;

(b) holding the first plate member against the second plate member in a jig means in a desired mutual orientation positioned in a longitudinally extending substantially upright plane;

(c) suspending from a supporting frame for universal movement thereon a horseshoe shaped yoke positioned in a laterally extending upright plane so as to straddle the first and second plate members to be drilled, the yoke having first and second depending legs and a transverse bight integral with the legs, the first leg being adjacent the first plate member and the second leg being adjacent the second plate member;

(d) inserting a hole finder on the first leg member into the pilot bore;

(e) providing a drill means on the second leg member having an axis aligned with the hole finder;

(f) sensing the orientation of the axis of the drill means relative to the second plate member;

(g) releasably clamping the first plate member to the second plate member from opposite sides thereof in the region of the pilot bore when the axis of the drill means is perpendicular to the second plate member; and (h) from the side of the second plate member, using the drill means, drilling fastener receiving bores through the first and second plate members axially aligned with the pilot bore;

whereby the formation of burrs at the interface between the first and second plate members is avoided.

2. A method of drilling as set forth in claim 1 including the step of:

(i) applying a sealant between the first and second plate members before performing step (b).

3. A method of drilling as set forth in claim 1 including the steps of:

(i) inserting a fastener through the axially aligned fastener receiving bores; and (j) securing the fastener to thereby affix the first and second plate members together.

* * * * *